(12) United States Patent
Xiao (10) Patent No.: US 11,725,884 B2
(45) Date of Patent: Aug. 15, 2023

(54) HEAT PIPE, METHOD FOR MANUFACTURING THE SAME, AND DEVICE

(71) Applicant: CHAMP TECH OPTICAL (FOSHAN) CORPORATION, Foshan (CN)

(72) Inventor: Fu-Ping Xiao, Foshan (CN)

(73) Assignee: CHAMP TECH OPTICAL (FOSHAN) CORPORATION, Foshan (CN)

( * ) Notice: Subject to any disclaimer, the term of this patent is extended or adjusted under 35 U.S.C. 154(b) by 150 days.

(21) Appl. No.: 17/236,424

(22) Filed: Apr. 21, 2021

(65) Prior Publication Data

US 2022/0187025 A1    Jun. 16, 2022

(30) Foreign Application Priority Data

Dec. 15, 2020    (CN) .......................... 202011484541.8

(51) Int. Cl.
```
F28D 15/04      (2006.01)
F28D 15/02      (2006.01)
B23P 15/26      (2006.01)
```
(52) U.S. Cl.
CPC ............ *F28D 15/046* (2013.01); *B23P 15/26* (2013.01); *F28D 15/0266* (2013.01); *B23P 2700/09* (2013.01)

(58) Field of Classification Search
CPC .............. F28D 15/046; F28D 15/0266; F28D 15/0283; F28D 15/04; B23P 15/26; B23P 2700/09; B21C 37/151; B21D 41/04; B21D 53/06
See application file for complete search history.

(56) References Cited

U.S. PATENT DOCUMENTS

| | | | | |
|---|---|---|---|---|
| 2006/0162907 | A1* | 7/2006 | Wu | F28D 15/046 165/146 |
| 2007/0034357 | A1* | 2/2007 | Hou | B23P 15/26 29/890.032 |
| 2007/0193722 | A1* | 8/2007 | Hou | F28D 15/0233 165/146 |
| 2007/0251673 | A1* | 11/2007 | Hou | F28D 15/046 165/146 |

(Continued)

FOREIGN PATENT DOCUMENTS

| | | |
|---|---|---|
| CN | 100491889 C | 5/2009 |
| CN | 100573019 C | 12/2009 |
| TW | I432690 B | 4/2014 |

*Primary Examiner* — Lee A Holly
(74) *Attorney, Agent, or Firm* — ScienBiziP, P.C.

(57) ABSTRACT

A heat pipe operating noiselessly by preventing, or reducing the effects of, the mixing of working fluid at different temperatures includes a hollow tube, a capillary structure, a working fluid, and a bushing. The porous capillary structure able to carry the fluid is disposed on an inner wall of the tube. The bushing is hollow, and the bushing is disposed on a surface of the capillary structure away from the tube. The heat pipe is divided into evaporation, adiabatic, and condensation sections, the capillary structure being at all sections. The working fluid is disposed in the capillary structure of the evaporation section, the bushing is disposed on a side of the capillary structure of the adiabatic section.

3 Claims, 10 Drawing Sheets

(56) References Cited

U.S. PATENT DOCUMENTS

| | | | |
|---|---|---|---|
| 2007/0267178 A1* | 11/2007 | Hou | F28D 15/046 |
| | | | 165/146 |
| 2014/0150995 A1* | 6/2014 | Dai | F28D 15/04 |
| | | | 29/890.032 |

* cited by examiner

HEAT PIPE, METHOD FOR MANUFACTURING THE SAME, AND DEVICE

FIELD

The subject matter herein generally relates to manufacturing processes, a method for manufacturing a heat pipe, and a device.

BACKGROUND

Devices using heat pipes, such as mechanical equipment, electronic products, etc., include heat-generating components. A heat pipe may be included in such a device for dissipating heat from the heat-generating components. The heat pipe is divided into an evaporation section, an adiabatic section, and a condensation section connected in this order. A working fluid flows from the evaporation section, the adiabatic section, and into the condensation section to dissipate the heat.

The amount of the working fluid in the heat pipe can be increased to increase the heat dissipation efficiency of the heat pipe. When the heat pipe is in operation, the working fluid evaporates in the evaporation section into gas form. The gas flows through the adiabatic section to the condensation section under the action of a small pressure difference, releases heat and condenses into liquid, and the liquid is taken back to the evaporation section. However, with the increased amount of the working fluid, when the working fluid is not completely vaporized in the evaporation section, the working fluid in the evaporation section and the condensation section will collide in the adiabatic section, which may cause noise. Therefore, there is a room for improvement.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 8:
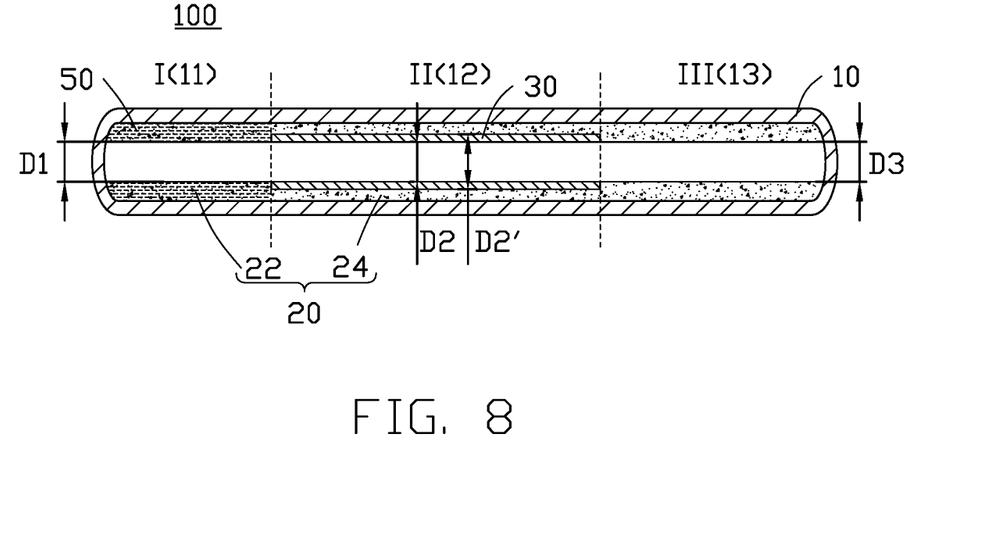
FIG. 8 is a cross-sectional view showing a working fluid injected into the capillary structure of the first area of FIG. 7 and then the tube sealed.
Figure 12:
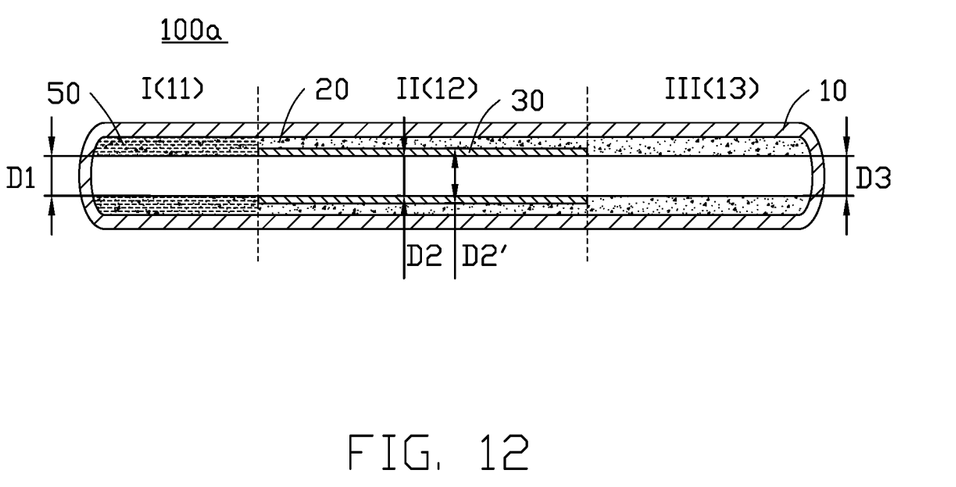
FIG. 12 is a cross-sectional view showing a working fluid injected into the capillary structure in the first area of FIG. 11, the tube then sealed.

Referring to FIG. 8 and FIG. 12, a heat pipe 100 is provided in an embodiment.

The heat pipe 100 includes a tube 10, a capillary structure 20, a working fluid 50, and a bushing 30. The tube 10 is hollow. The capillary structure 20 is disposed on an inner wall of the tube 10. The working fluid 50 is disposed in the capillary structure 20. The bushing 30 is hollow and disposed on a surface of the capillary structure 20 away from the tube 10. The heat pipe 100 is divided into an evaporation section 11, an adiabatic section 12, and a condensation section 13, connected in this order. The capillary structure 20 is disposed at or in the evaporation section 11, the adiabatic section 12, and the condensation section 13. The working fluid 50 is disposed in and infills the capillary structure 20 of the evaporation section 11. The bushing 30 is disposed on a side of the capillary structure 20 of the adiabatic section 12.

During use, the working fluid 50 of the evaporation section 11 collects heat and is thereby vaporized to form gas. The gas carrying heat flows through the bushing 30 of the adiabatic section 12 to the condensation section 13. Upon losing heat, the gas is liquefied and transformed into liquid in the condensation section 13. The liquid passes through the capillary structure 20 of the adiabatic section 12 back to the evaporation section 11. When the working fluid 50 in the heat pipe 100 is not completely vaporized, the non-vaporized working fluid 50 and the vaporized gas pass through the bushing 30. The liquefied fluid in the condensation section 13 flows through the capillary structure 20 disposed outside the bushing 30. Therefore, the bushing 30 prevents the non-vaporized working fluid 50 and the liquefied working fluid 50 from mixing and colliding with each other, and noise is thus avoided. In addition, the bushing 30 allows the addition of more working fluid 50, so heat dissipation performance and efficiency of the heat pipe 100 are improved.

The tube 10 is made of metal material with good thermal conductivity, such as copper or aluminum.

The shape of the tube 10 can be set as required. For example, the tube 10 can be a round tube, a square tube, or a flat tube. The tube 10 is hollow, so that the working fluid 50 can circulate, absorb heat to evaporate into gas, and carry the heat.

In an embodiment, an inner wall of the tube 10 is smooth. In another embodiment, the inner wall of the tube 10 can define grooves to facilitate the adsorption of liquid.

The capillary structure 20 is made of metal, such as copper or aluminum. The capillary structure 20 is formed by metal powders, metal braided wires, or metal braided meshes. The capillary structure 20 is porous to facilitate the flow of the working fluid 50.

The bushing 30 is hollow to facilitate a passage of the gas. The bushing 30 is made of metal. The bushing 30 is spaced apart from the tube 10. The bushing 30 and the tube 10 are connected by a capillary structure 20 of the adiabatic section 12.

In an embodiment, the tube 10 is integrally formed or composed of multiple sections. The bushing 30 is tubular or sheet-shaped.

A thickness of the capillary structure 20 can be set according to a required heat dissipation efficiency, volume, cost, and usage environment of the heat pipe 100.

An inner wall of the bushing 30 is smooth. Thus, a resistance of gas passing through the bushing 30 can be reduced, so that the gas carrying heat can pass through the bushing 30 quickly, thereby reducing a thermal resistance of the heat pipe 100.

Referring to FIG. 8, in an embodiment, an inner diameter D1 of the capillary structure 20 of the evaporation section 11 is greater than or equal to an inner diameter D2 of the bushing 30 and smaller than an outer diameter D2' of the bushing 30. An inner diameter D3 of the capillary structure 20 of the condensation section 13 is equal to an inner diameter D2 of the bushing 30.

Referring to FIG. 12, in an embodiment, each of the inner diameter D1 of the capillary structures 20 of the evaporation section 11 and the inner diameter D3 of the capillary structures 20 of the condensation section 13 is equal to the inner diameter D2 of the bushing 30.

Figure 13:
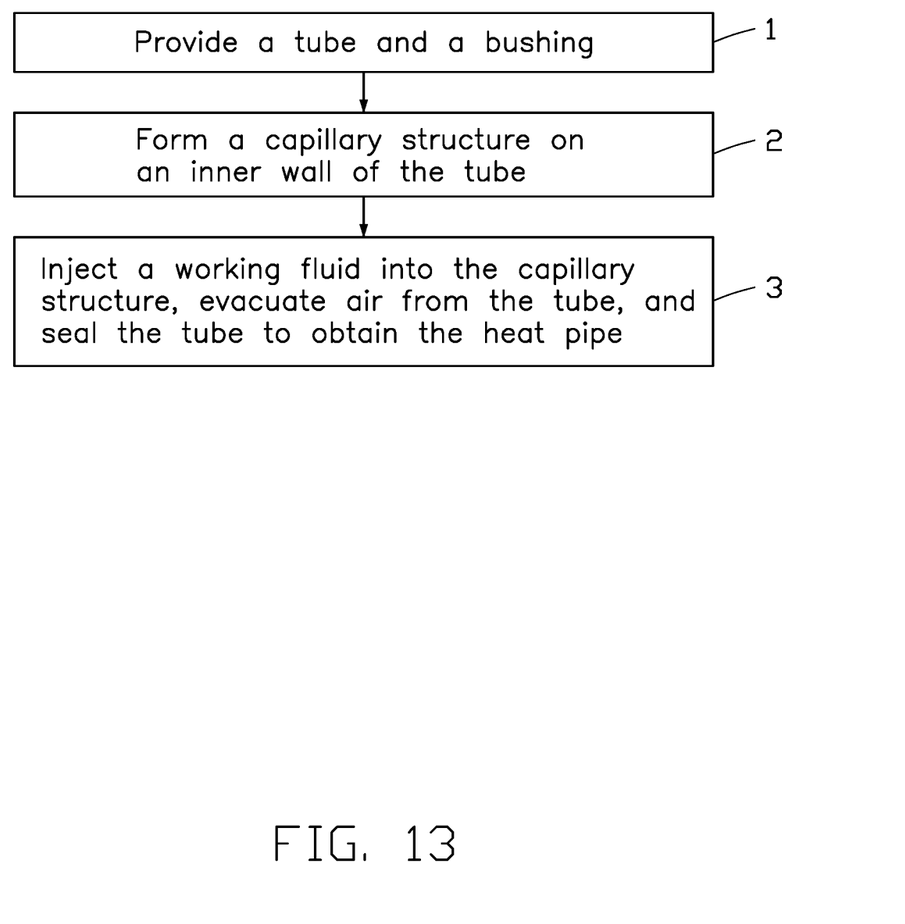
FIG. 13 is a flowchart of an embodiment of a method for manufacturing the heat pipe.

Referring to FIGS. 1 to 8, a method for the manufacturing of the heat pipe 100 is provided in accordance with an embodiment. The method is provided by way of example, as there are a variety of ways to carry out the method. Referring to FIG. 13, the method can begin at block 1.

Figure 1:
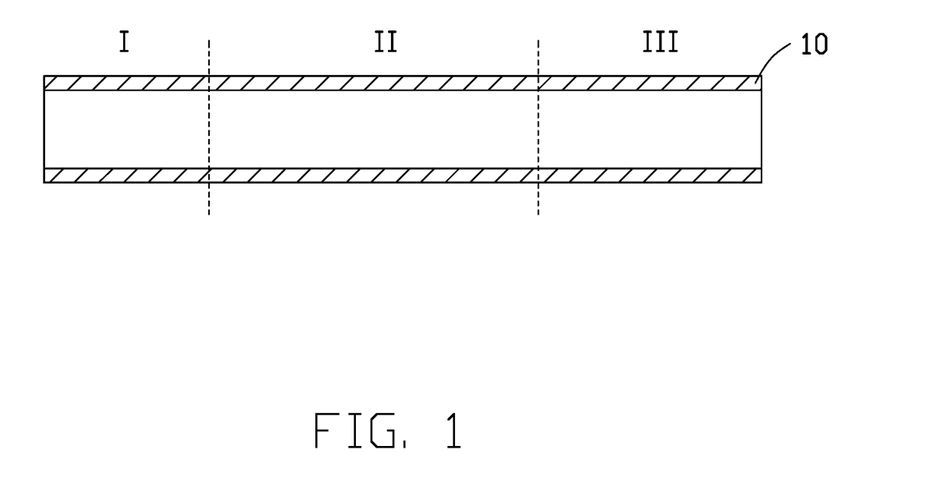
FIG. 1 is a cross-sectional view of an embodiment of a tube for a heat pipe, including a first area, a second area, and a third area.
Figure 2:
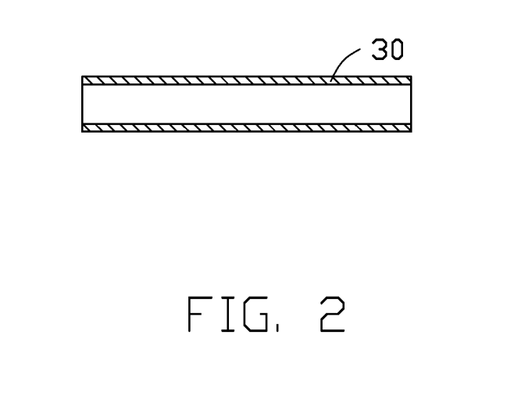
FIG. 2 is a cross-sectional view of an embodiment of a bushing.

In block 1, referring to FIGS. 1 to 2, a tube 10 and a bushing 30 are provided. An inner diameter of the tube 10 is greater than an outer diameter of the bushing 30. The tube 10 comprises a first area I, a second area II, and a third area III connected in this order.

The tube 10 and the bushing 30 are both hollow.

A length of the tube 10 is greater than a length of the bushing 30. The inner diameter of the tube 10 is larger than the outer diameter of the bushing 30, so that the bushing 30 can be received in the tube 10.

The tube 10 and the bushing 30 are made of metal materials with good thermal conductivity, such as copper or aluminum.

In block 2, referring to FIGS. 3 to 7, a capillary structure 20 is formed on the inner wall of the tube 10 in the first area I, the second area II, and the third area III. The bushing 30 is disposed on the surface of the capillary structure 20 in the second area II away from the tube 10.

Figure 14:
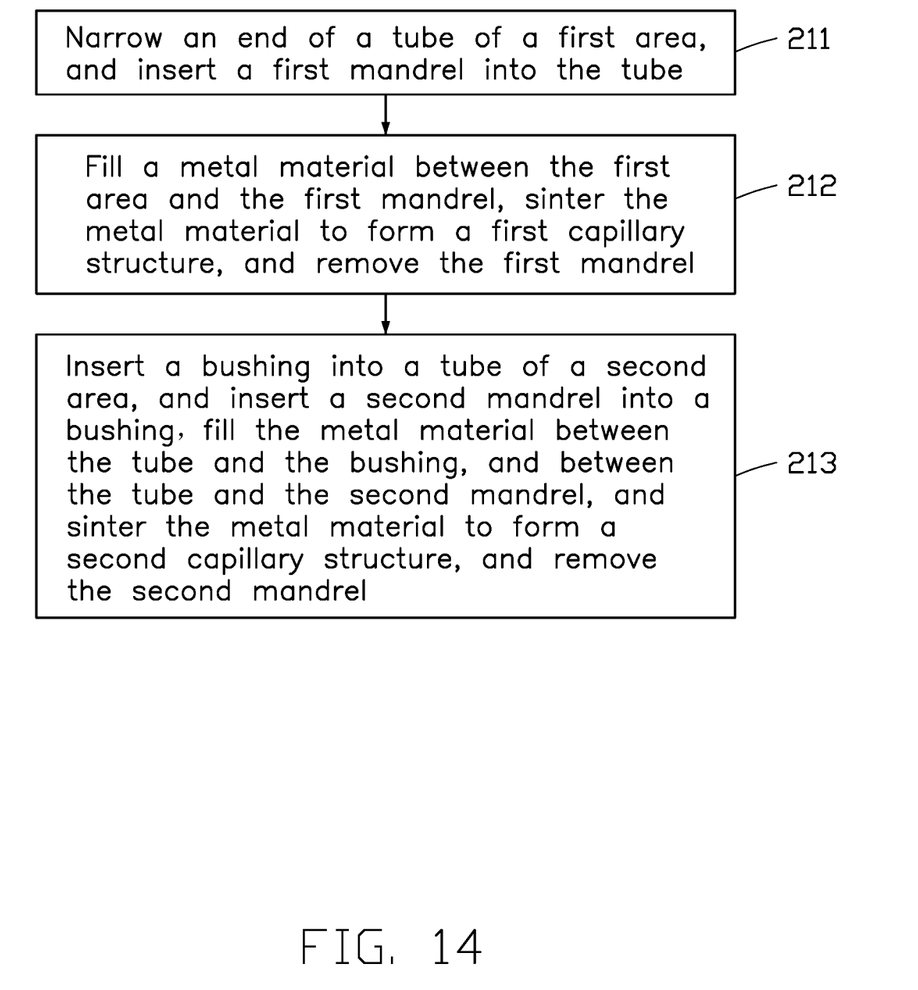
FIG. 14 is a flowchart of an embodiment of a method for manufacturing the capillary structure.

In an embodiment, referring to FIG. 14, block 2 can be carried out as follows.

Figure 3:
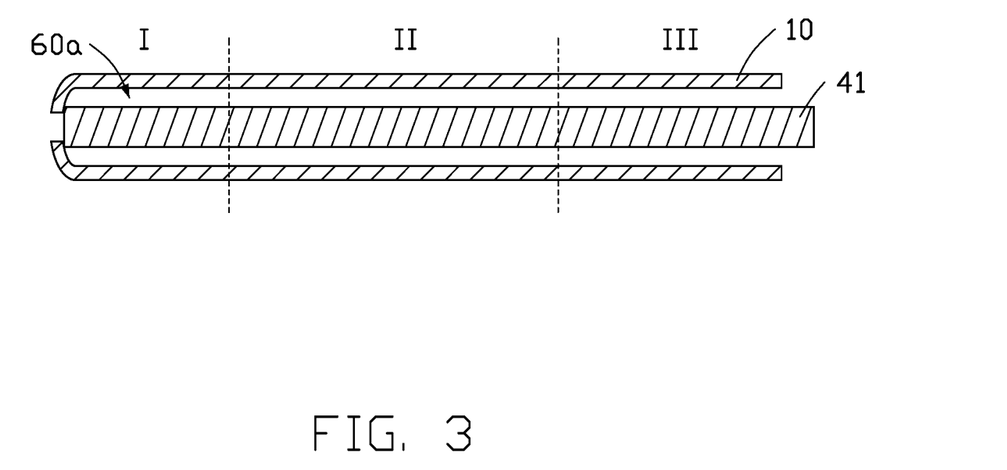
FIG. 3 is a cross-sectional view showing an end of the tube of FIG. 1 reduced in diameter, and a first mandrel inserted into the tube, in one embodiment.

In block 211, referring to FIG. 3, an end of the tube 10 disposed in the first area I is narrowed, and a first mandrel 41 is inserted into the tube 10 from the other end of the tube 10.

A diameter of the first mandrel 41 is smaller than the inner diameter of the tube 10, so that the first mandrel 41 can be inserted into the tube 10.

An inner diameter of a narrowed end of the tube 10 in the first area I is smaller than the diameter of the first mandrel 41, so that the first mandrel 41 can be inserted into the tube 10 from the other end of the tube 10 and then abut against one end of the tube 10. A gap 60a is formed between the narrowed end of the tube 10 and the first mandrel 41. The gap 60a can be infilled with metal material 26.

Figure 4:
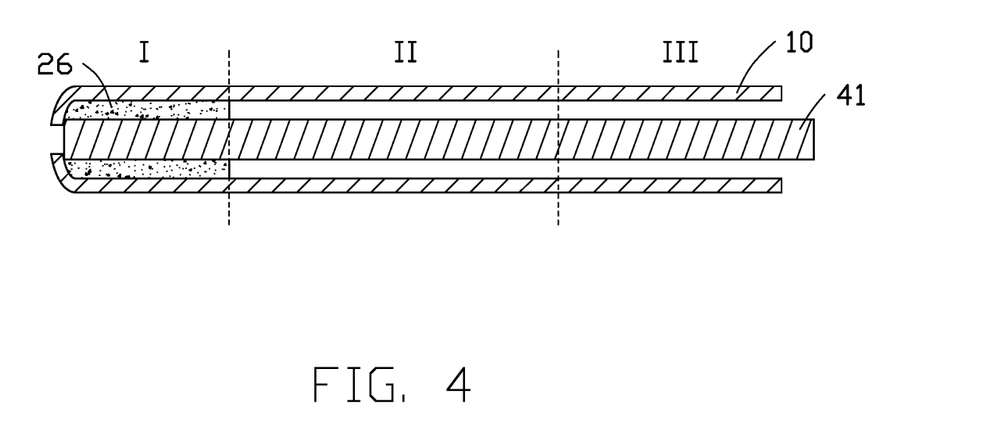
FIG. 4 is a cross-sectional view showing a first capillary structure formed between the first area of the tube and the first mandrel of FIG. 3.
Figure 5:
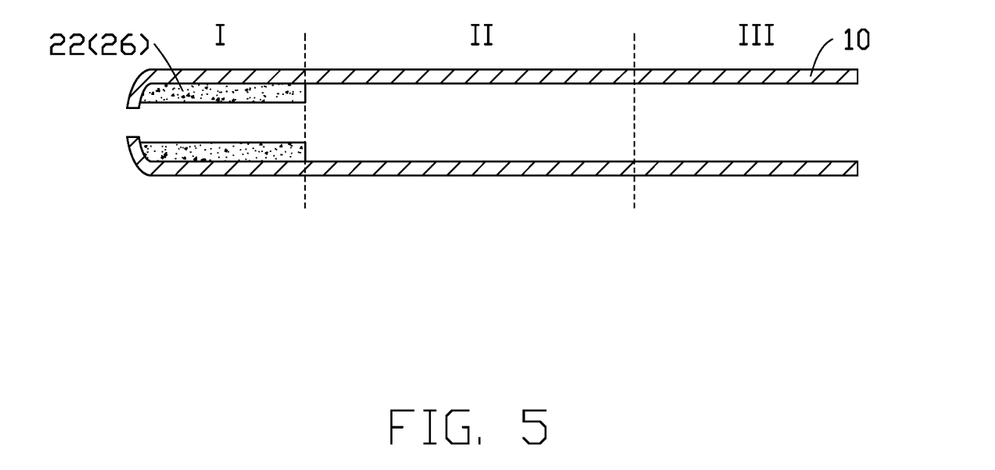
FIG. 5 is a cross-sectional view showing the first mandrel of FIG. 4 removed.

In block 212, referring to FIGS. 4 to 5, metal material 26 fills a space between the first area I and the first mandrel 41. The metal material 26 surrounds the first mandrel 41. The metal material 26 is sintered to form a first capillary structure 22, and then the first mandrel 41 is removed.

The metal material 26 is metal powders, metal braided wires, or metal braided meshes. The metal material 26 is made of metal, such as copper or aluminum. In an embodiment, the metal material 26 is copper with certain toughness, rendering the metal material 26 easy to be processed and shaped.

The metal material 26 is disposed in the gap 60a formed between the tube 10 and the first mandrel 41, and the metal material 26 surrounds the first mandrel 41. In an embodiment, along an extending direction of the tube 10, a length of the metal material 26 filling the tube 10 and the first mandrel 41 is a quarter of a length of the tube 10. In other embodiments, the length of the metal material 26 filling the gap 60a can be set as required.

A sintering temperature is lower than a melting point of the metal, so that the metal material 26 is less than solid during the sintering process, and the metal material 26 forms a capillary structure 20 with pores. In some embodiments, the metal material 26 is copper, and is sintering temperature from 900° C. to 1000° C., for example, 930° C., 960° C., or 990° C. After sintering, the metal material 26 forms a porous first capillary structure 22, that is, the evaporation section 11 is thereby formed.

Figure 6:
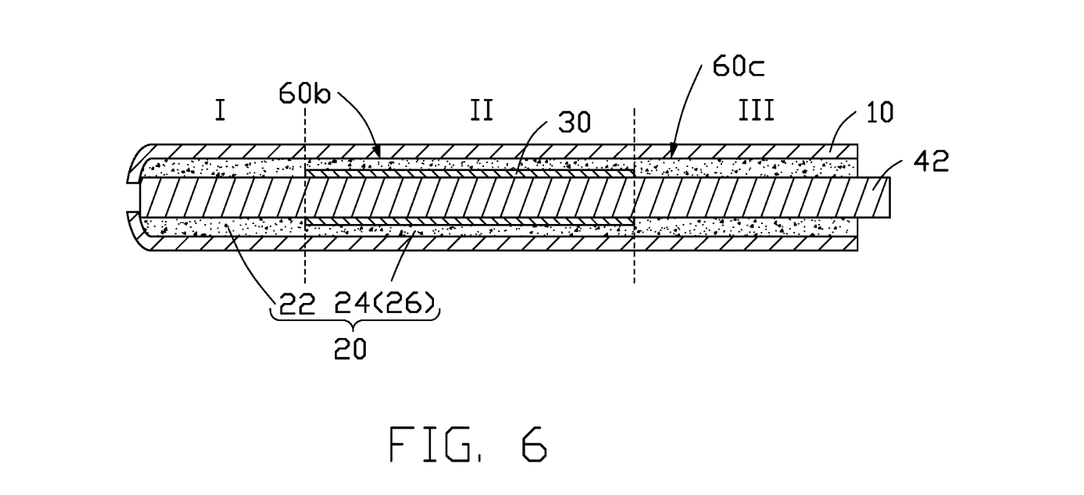
FIG. 6 is a cross-sectional view showing the bushing of FIG. 2 inserted into the second area of the tube of FIG. 5, and a second mandrel inserted into the bushing to form a capillary structure in the second area and the third area.
Figure 7:
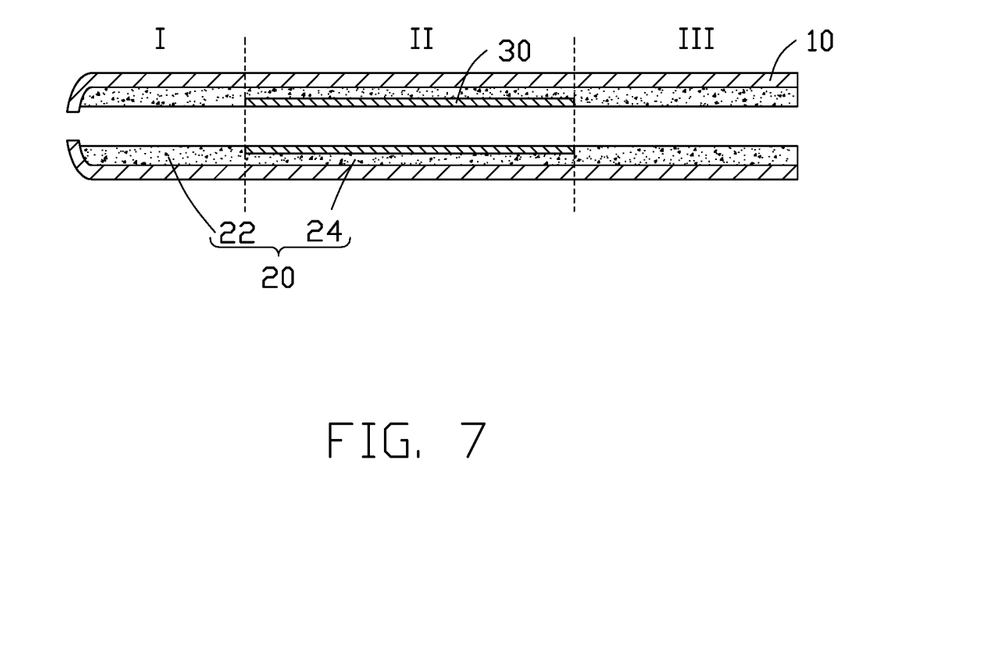
FIG. 7 is a cross-sectional view showing the second mandrel of FIG. 6 removed.

In block 213, referring to FIGS. 6 to 7, the bushing 30 is inserted into the second area II. A second mandrel 42 is inserted into the bushing 30, causing the second mandrel 42 to extend to the third area III. A metal material 26 is infilled in the space between the tube 10 and the bushing 30, and between the tube 10 and the second mandrel 42. The metal material 26 is sintered to become a second capillary structure 24, and then the second mandrel 42 is removed.

The bushing 30 is disposed in the second area II of the tube 10. An outer diameter D2' of the bushing 30 is greater than the inner diameter D1 of the first capillary structure 22. One end of the bushing 30 abuts against one end of the first capillary structure 22 of the first area I. A gap 60b is formed between the bushing 30 and the tube 10 of the second area II. The second mandrel 42 extends from one end of the bushing 30 to the third area III. A gap 60c is formed between the second mandrel 42 and the tube 10 of the third area III. The metal material 26 is sintered after infilling the gap 60b and the gap 60c, and the sintered metal material 26 forms the second capillary structure 24.

In an embodiment, one end of the second mandrel 42 extends from the end of the bushing 30 adjacent to the first area I to the first area I, and further passes through the first capillary structure 22 to abut the end of the tube 10. Thus, during forming the second capillary structure 24, the first capillary structure 22 is integrally complete, for example, metal powders are not scattered. In an embodiment, the inner diameter D1 of the first capillary structure 22 is equal to the outer diameter D2' of the bushing 30.

When the capillary structure 20 is formed by the above two-step sintering process, the inner diameter D1 of the capillary structure 20 of the first area I may be greater than or equal to the inner diameter D2 of the bushing 30, but smaller than the outer diameter D2' of the bushing 30. The inner diameter D3 of the capillary structure 20 of the third area III is equal to the inner diameter D2 of the bushing 30. That is, a relationship between the capillary structure 20 and a content of the working fluid 50 can be adjusted by controlling a thickness and/or length of the capillary structure 20 in each area, a size of the bushing 30 (such as length, thickness, inner diameter, outer diameter, etc.), or the size relationship between the bushing 30 and the capillary structure 20, etc. Thus, the heat dissipation efficiency of the heat pipe 100 is controlled to meet different heat dissipation requirements.

Since the metal material 26 shrinks during the sintering process, the above two-step sintering process can adjust a position of the bushing 30, thereby controlling the sintering quality of the heat pipe 100. In addition, the relationship between the capillary structure 20 and the content of the working fluid 50 can also be controlled to adjust the heat dissipation efficiency of the heat pipe 100.

In some embodiments, the bushing 30 may include multiple sections. Each section of the bushing 30 is tubular or sheet-shaped. In some embodiments, a sheet or ribbon of metal may be wound on the surface of the second mandrel 42 to form an annular bushing 30.

In some embodiments, before the capillary structure 20 is formed on the inner wall of the tube 10, the tube 10 and the bushing 30 are first washed with chemical reagents, to remove oil on the surface of the tube 10 and the bushing 30. Thus, the metal material 26 can adhere on the inner wall of the tube 10 and the bushing 30 more firmly.

In block 3, referring to FIG. 8, a working fluid 50 is injected into the capillary structure 20 of the first area I. Air is evacuated from the tube 10 to create vacuum in the tube 10, and the tube 10 is sealed to obtain the heat pipe 100.

In an embodiment, the tube 10 of the third area III is narrowed by an argon arc welding device for example. In some embodiment, a metal oxide produced during welding can be reduced to metal in a high-temperature furnace filled with oxy-reducing gas. Since a thermal conductivity of the metal oxide is lower than that of the metal, the greater purity of metal instead of metal oxide improves the thermal conductivity of the heat pipe 100.

The working fluid 50 is injected into the capillary structure 20 of the first area I. The working fluid 50 is water, acetone, or ethanol.

After the working fluid 50 is injected, the vacuum treatment is performed, and then an argon arc welding device is used to seal the tube 10 of the first area I. The vacuum treatment improves the thermal conductivity of the heat pipe 100.

Figure 9:
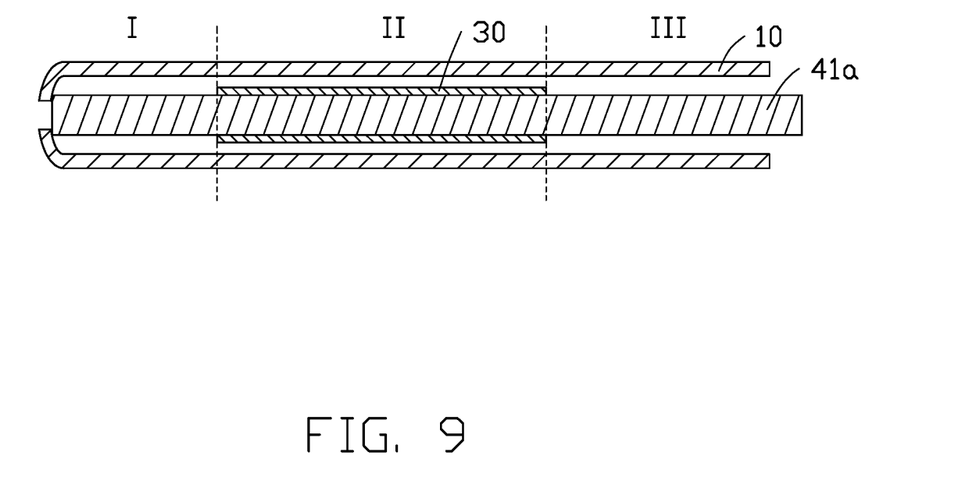
FIG. 9 is a cross-sectional view showing an end of the tube of FIG. 1 narrowed, the bushing shown in FIG. 2 inserted into the tube in the second area, and a first mandrel inserted into the bushing, in another embodiment.
Figure 10:
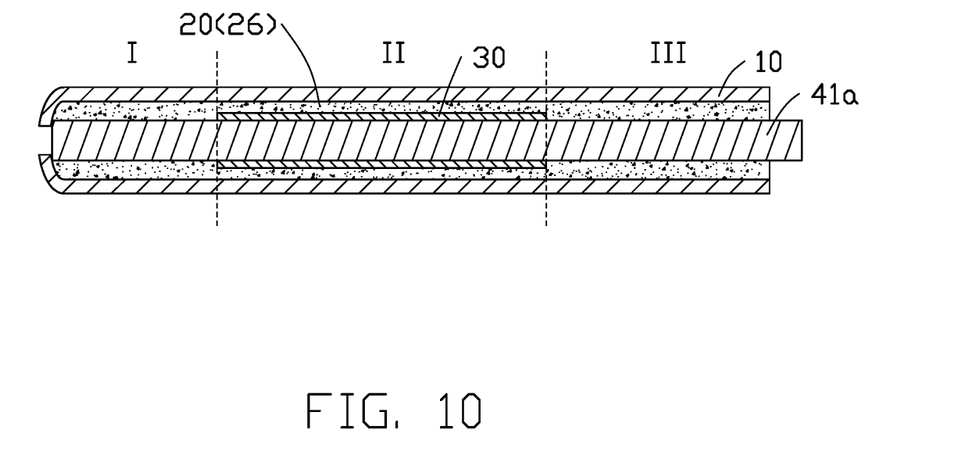
FIG. 10 is a cross-sectional view showing a capillary structure formed in the first area, the second area, and the third area of an inner wall of the tube of FIG. 9.

Referring to FIGS. 9 to 10, in another embodiment, in the process of forming the heat pipe 100a, before inserting the bushing 30 and the second mandrel 42 into the tube 10, the steps of sintering and removing the first mandrel 41 may be omitted. That is, the evaporation section 11 (first area I), the adiabatic section 12 (second area II), and the condensation section 13 (third area III) can be formed at the same time through a single sintering process.

Figure 15:
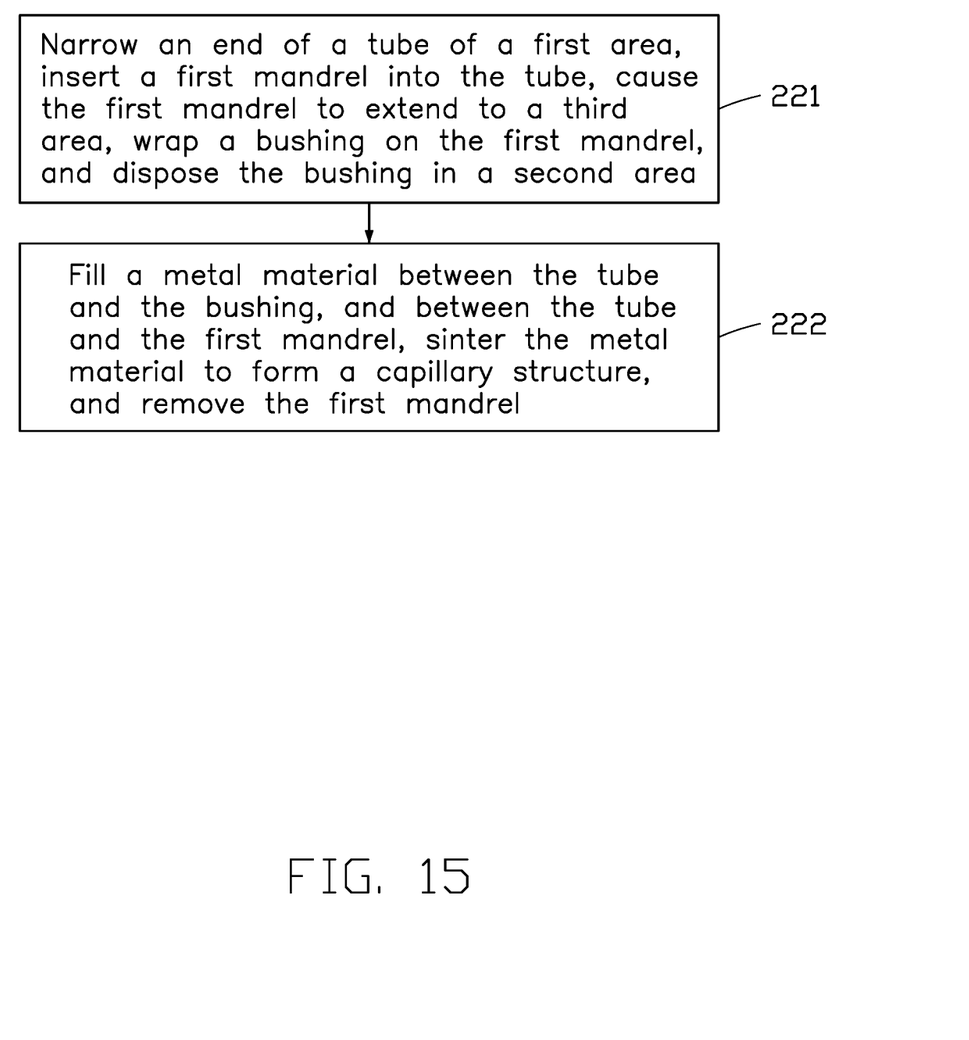
FIG. 15 is a flowchart of another method for manufacturing the capillary structure.

In an embodiment, referring to FIG. 15, the block of 2 can be carried out as follows.

In block 221, referring to FIG. 9, the tube 10 at one end of the first area I is narrowed and a first mandrel 41a is inserted into the tube 10 from the other end of the tube 10, causing the first mandrel 41a to extend to the third area III. The bushing 30 is wrapped around the first mandrel 41a and is disposed in the second area II.

Figure 11:
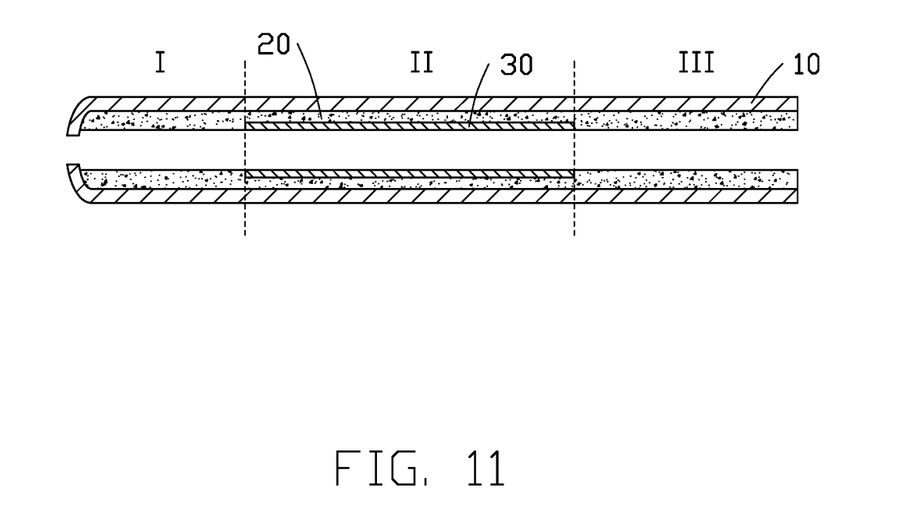
FIG. 11 is a cross-sectional view showing the first mandrel of FIG. 10 removed.

In block 222, referring to FIGS. 10 to 11, a metal material 26 is infilled into the space between the tube 10 and the bushing 30, and between the tube 10 and the first mandrel 41a. The metal material 26 is sintered to form the capillary structure 20, and then the first mandrel 41a is removed.

Thus, the capillary structure 20 is formed by a single-step sintering process, which can reduce cost. Referring to FIG. 12, each of the inner diameter D1 of the capillary structures 20 of the first area I and the inner diameter D3 of the capillary structures 20 of the third area III is equal to the inner diameter D2 of the bushing 30.

In some embodiments, the bushing 30 may include multiple sections wrapped on the first mandrel 41a. In some embodiments, a ribbon or sheet of metal may also be wound on the surface of the first mandrel 41a, thereby forming an annular bushing 30.

In some embodiments, the heat pipe 100 may further be bent, squashed, or rounded according to actual requirements.

In some embodiments, after the heat pipe 100 is formed, the heat pipe 100 can further be tested in order to remove defects. For example, the test can include heating aging test, water bath test, heat dissipation efficiency test, appearance test, etc.

Figure 16:
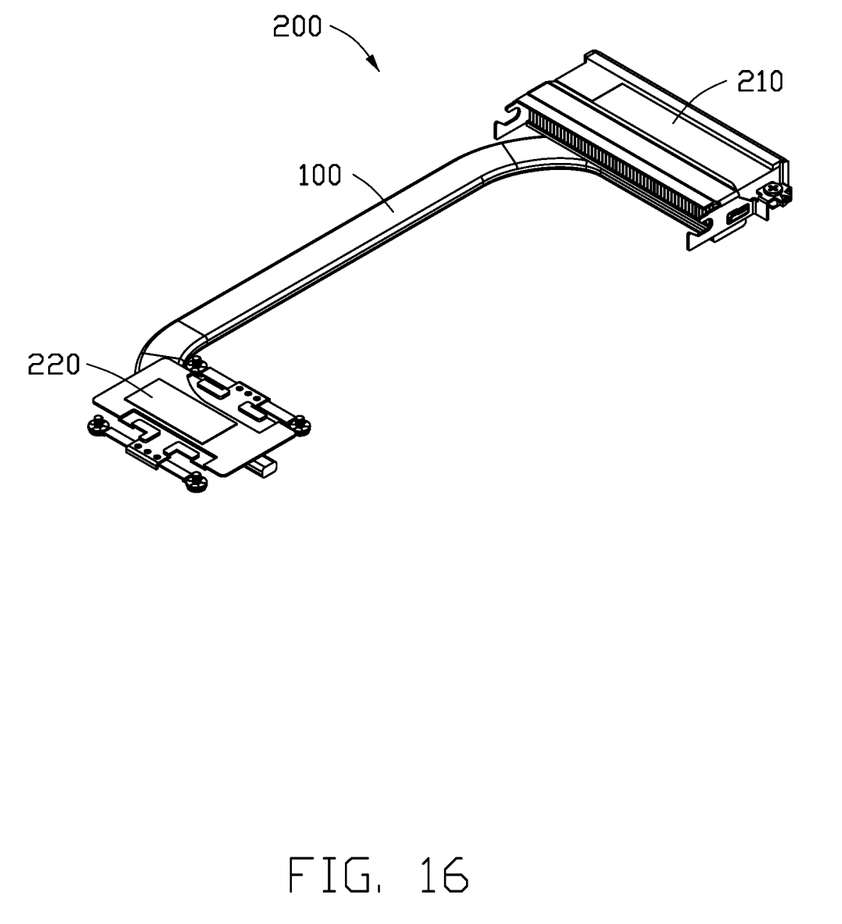
FIG. 16 is a diagrammatic view of an embodiment of a device.

Referring to FIG. 16, a device 200 is provided. The device 200 may be a mobile phone, a computer, a camera, etc., or may be other mechanical devices with a heat-generating characteristic.

The device 200 comprises a heat dissipation assembly 210, a heat-generating element 220, and a heat pipe 100. The heat pipe 100 is connected to the heat-generating element 220 and the heat dissipation assembly 210. The heat-generating element 220 generates heat. The heat is transferred to the heat dissipation assembly 210 through the heat dissipation effect of the heat pipe 100 to further quickly dissipate the heat, so that the device 200 is maintained in a suitable temperature range.

The heating-generating element 220 could be a battery, a CPU, or the like.

The heat pipe 100 is provided with a bushing 30 in the adiabatic section 12. When the working fluid 50 in the heat pipe 100 is not completely vaporized, the non-vaporized working fluid 50 and the vaporized gas pass through the bushing 30. The liquefied fluid in the condensation section 13 flows through the capillary structure 20 disposed outside the bushing 30. Therefore, the bushing 30 insulates the flow path of the non-vaporized working fluid 50 and the liquefied working fluid 50, the bushing 30 prevents the non-vaporized working fluid 50 and the liquefied working fluid 50 from mixing and colliding with each other. and noise is thus avoided.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a heat pipe, comprising:
providing a hollow tube and a hollow bushing, the tube comprising a first area, a second area, and a third area connected in this order;
forming a capillary structure on an inner wall of the first area, the second area, and the third area, and disposing the bushing on a surface of the capillary structure of the second area away from the tube; and
injecting a working fluid into the capillary structure of the first area and then evacuating air from the tube, and sealing the tube to obtain the heat pipe;
wherein the capillary structure comprises a first capillary structure and a second capillary structure, the method further comprising:
narrowing an end of the tube of the first area, and inserting a first mandrel into the tube from another end of the tube;
filling the metal material between the first area and the first mandrel, the metal material surrounds the first mandrel, sintering the metal material to form the first capillary structure, and removing the first mandrel;
inserting the bushing into the second area, and inserting a second mandrel into the bushing, causing the second mandrel to extend to the third area; and
filling the metal material between the tube and the bushing, and between the tube and the second mandrel, and sintering the metal material to form the second capillary structure, and removing the second mandrel.

2. The method of claim 1, wherein the metal material is copper, and is sintered at temperature from 900° C. to 1000° C.

3. The method of claim 1, wherein the metal material comprises at least one of metal powders, metal braided wires, and metal braided meshes.

* * * * *